United States Patent [19]

Leigh-Monstevens

[11] Patent Number: 4,621,565

[45] Date of Patent: Nov. 11, 1986

[54] HYDRAULIC SLAVE CYLINDER SWITCH

[75] Inventor: Keith V. Leigh-Monstevens, Troy, Mich.

[73] Assignee: Automotive Products plc, Warwickshire, England

[21] Appl. No.: 641,056

[22] Filed: Aug. 15, 1984

[51] Int. Cl.[4] .............................................. F01B 31/12
[52] U.S. Cl. ........................................ 92/5 R; 60/534; 60/545; 200/82 R; 200/83 S; 180/272; 192/0.084; 192/0.096
[58] Field of Search .................. 60/534, 545; 91/1; 92/5 R; 180/271, 272; 200/82 R, 82 DA, 82 D, 83 S, 83 SA

[56] References Cited

U.S. PATENT DOCUMENTS

| 1,337,282 | 4/1920 | Slawter | 200/82 R |
|---|---|---|---|
| 2,047,382 | 7/1936 | Reed | 200/82 R |
| 2,239,348 | 4/1941 | Wirtanen et al. | 92/5 R |
| 2,659,018 | 11/1953 | Harrison | 200/82 DA |
| 2,859,296 | 11/1958 | Nev | 200/82 D |
| 2,949,105 | 8/1960 | Davis | 200/82 DA |
| 3,406,800 | 10/1968 | Buchanan et al. | 200/82 R |
| 4,033,311 | 7/1977 | Burson | 180/271 |
| 4,077,217 | 3/1978 | Leiber | 60/545 |
| 4,140,045 | 2/1979 | Hardwick et al. | 92/5 R |
| 4,417,236 | 11/1983 | Hung | 92/5 R |
| 4,530,209 | 7/1985 | Steffes | 60/547.1 |

Primary Examiner—Robert E. Garrett
Assistant Examiner—Richard S. Meyer
Attorney, Agent, or Firm—Hauke & Patalidis

[57] ABSTRACT

An electrical switch for sensing operation of a hydraulic cylinder, the switch being normally open and closing an electrical circuit when the cylinder is pressurized to effect a desired operation only when there is fluid at a predetermined pressure in the cylinder. The hydraulic cylinder is the slave cylinder of a motor vehicle clutch hydraulic control and the electrical circuit controlled by the switch is, for example, the motor vehicle engine starter motor relay circuit, such that the starter relay circuit is inhibited unless sufficient pressure is present in the cylinder, corresponding to the pressure necessary to cause the slave cylinder output member to fully release the clutch.

7 Claims, 5 Drawing Figures

HYDRAULIC SLAVE CYLINDER SWITCH

BACKGROUND OF THE INVENTION

The present application relates to an electrical switch operated by the output member of a hydraulic slave cylinder, such as the slave cylinder of a motor vehicle clutch hydraulic control system.

Hydraulic control apparatus for motor vehicle mechanical clutches are in wide use at the present for operating the clutch release mechanism of a motor vehicle provided with a mechanical clutch and a conventional manually shiftable transmission or gearbox. Examples of such hydraulic control systems for mechanical clutches are disclosed in U.S. Pat. Nos. 4,407,125 and 4,454,632, and in co-pending application Ser. Nos. 371,958 now abandoned, 376,248 issued, 477,161 U.S. Pat. No. 4,585,108, 477,162 U.S. Pat. No. 4,515,109, 477,159 U.S. Pat. No. 4,585,106, 477,160 U.S. Pat. No. 4,585,107, 537,869, 555,667 now abandoned, 555,666, 555,668, all assigned to the same assignee as the present application.

It has been general practice in the automobile industry to interlock the operation of a motor vehicle engine starter motor with other controls such that the starter motor is rendered inoperated unless the transmission is in neutral or park, in motor vehicles provided with an automatic transmission or, in motor vehicles provided with a foot operated clutch and a manually operated gear shift transmission, unless the transmission is in neutral and/or the clutch pedal is fully depressed.

In application Ser. No. 590,168, filed Mar. 16, 1984 for Hydraulic Master Cylinder Switch, master cylinder switches are disclosed that close an electrical circuit when the clutch pedal is fully depressed, thus resulting in the master cylinder input member being fully retracted. Under normal operative conditions, fully depressing the clutch pedal results in transferring hydraulic fluid from the master cylinder to the slave cylinder operating the clutch release mechanism. Therefore, under normal conditions, full depression of the clutch pedal results in full release of the mechanical clutch, and such an arrangement, consisting in having the starter motor relay interlock circuit enabled as a result of the clutch pedal being fully depressed, has been found to be fully satisfactory unless the conduit interconnecting the master cylinder and the slave cylinder has been accidentally ruptured, or loss of hydraulic fluid has other wise occurred, or the slave cylinder, for some other reasons, has become inoperative. Under such abnormal operative conditions, the clutch pedal may be fully depressed although the mechanical clutch could remain engaged.

Total loss of hydraulic fluid in a motor vehicle clutch control hydraulic apparatus may be detected by placing a level sensor in the hydraulic fluid reservoir associated with the master cylinder. Total or substantial loss of hydraulic fluid results in the level sensor providing a visual and/or audio indication to the driver or, in the alternative, the level sensor may be part of the starting motor relay circuit, functioning as an interlock switch. However, low hydraulic fluid level in the master cylinder reservoir does not necessarily indicate that the clutch hydraulic control apparatus is non-operative. Under conditions of low hydraulic fluid level in the reservoir, sufficient hydraulic fluid may be present in the system to maintain the apparatus in an operative condition.

It is therefore desirable to provide an interlock switch whose function is controlled by the clutch release slave cylinder, rather than by the master cylinder and which is, for example, actuated either directly by the hydraulic fluid pressure in the working chamber of the slave cylinder or by the reaction load upon the slave cylinder output member on actuation of the clutch from fully engaged to fully released.

Alternatively, as disclosed in application Ser. No. 641,055, filed contemporaneoiusly herewith, the interlock switch may be such as to be closed as a result of a full stroke of the slave cylinder output member required for releasing the clutch which, in turn, requires that the switch be operated at a predetermined position of the output member corresponding to such full release of the mechanical clutch. As pointed out above, a pressure switch mounted on a master cylinder may correctly detect an increase of pressure in the cylinder and transmit a proper signal to an indicator in the driver's compartment. Installing a pressure switch on or in a slave cylinder provides an indication of the presence of hydraulic fluid at a given pressure in the slave cylinder. However detecting hydraulic fluid pressure in the slave cylinder, rather than in the master cylinder provides a more reliable indication that the clutch release mechanism has had sufficient force applied to it to insure its operation.

SUMMARY OF THE INVENTION

A principal object of the present invention is to provide a more reliable interlock switch arrangement for hydraulically operated clutches employing master-slave cylinder systems than heretofor available.

This object is achieved by providing a switch which functions only if there is sufficient force applied by the slave cylinder output member to insure proper operation of the clutch release mechanism.

According to the invention the switch is integrated into the physical clutch operating components in such a manner as to detect pressure increase beyond a threshold value normally indicating full release of the clutch.

These and other objects and advantages of the present invention will become apparent to those skilled in the art when the following description of the best modes contemplated, at the present, for practicing the invention are read in conjunction with the accompanying drawing wherein like reference numerals refer to like or equivalent parts and in which:

DETAILED DESCRIPTION OF THE PREFERRED EMBODIMENTS

Figure 1:
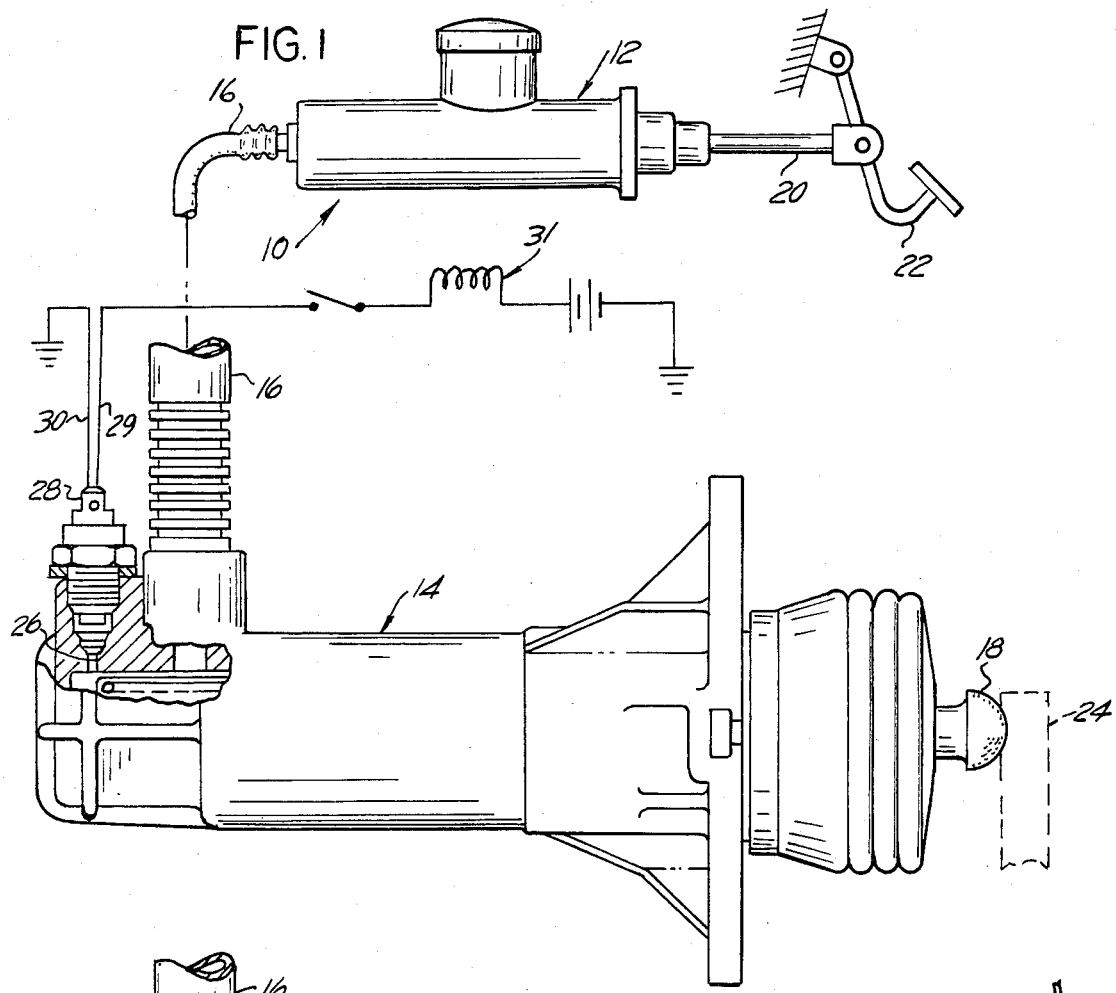
FIG. 1 is a partly schematic illustration, partly sectioned, of a hydraulic master-slave cylinder apparatus having a hydraulically actuatable electrical switch on the slave cylinder.

Referring now to the drawings and more particularly to FIG. 1 wherein there is illustrated a typical hydraulic apparatus assembly 10 comprising a master cylinder 12, and a slave cylinder 14 interconnected by a conduit 16 in the form of a flexible hose, for example. As is well known, the slave cylinder includes a piston, not shown, which functions under pressure to exert force upon a slave cylinder piston rod 18. The master cylinder, as is well known, also has a piston, not shown, and a piston rod 20.

Movement of the master cylinder piston rod 20 causes a corresponding movement of the piston rod or actuator 18 of the slave cylinder 14, as a result of transferring a portion of the hydraulic fluid from the master cylinder 12 through the conduit 16 to the slave cylinder 14. The piston rod 20, or input member of the master cylinder 12 may be operated, for example, by the clutch release pedal 22 of a motor vehicle, the master cylinder 12 being installed, for example, below the floorboard of the motor vehicle driver compartment, and the slave cylinder 14 being attached on the underframe of the vehicle in an appropropriate position such that the end of its piston rod 18 actuates the release mechanism 24 of the motor vehicle friction clutch, not shown.

The slave cylinder is, as is known, provided with a bleed opening 26. There is normally provided a plain threaded plug, not shown, for the bleed opening 26. Air is "bled" from the system in a known manner, through the bleed opening and the plug inserted thereafter to close the opening. As shown in FIG. 1, an electric hydraulically actuatable pressure switch 28 of a known type can be inserted in place of the usual bleed plug. The system can then still be "bled" in the customary manner and then closed by insertion of the pressure switch 28. In addition the pressure switch provides a means for indicating pressurization of the slave cylinder and/or providing control or interlock functions. Thus the pressure switch 28 can be associated with an electrical indicator in the driver s compartment in a known manner or be connected in series in the motor vehicle engine starter motor relay circuit, for example, shown schematically at 31 associated with a gear shifting linkage interlock circuit, for example, to prohibit engine starting or gear shifting if the slave cylinder does not contain fluid at clutch operating pressure corresponding to full release of the clutch.

As set forth above, a principal object of this invention is to provide a more reliable means of sensing whether the operation of devices by remote hydraulic cylinders are occuring than heretofore provided, and thus to provide a more reliable indication or control means.

Figure 2:
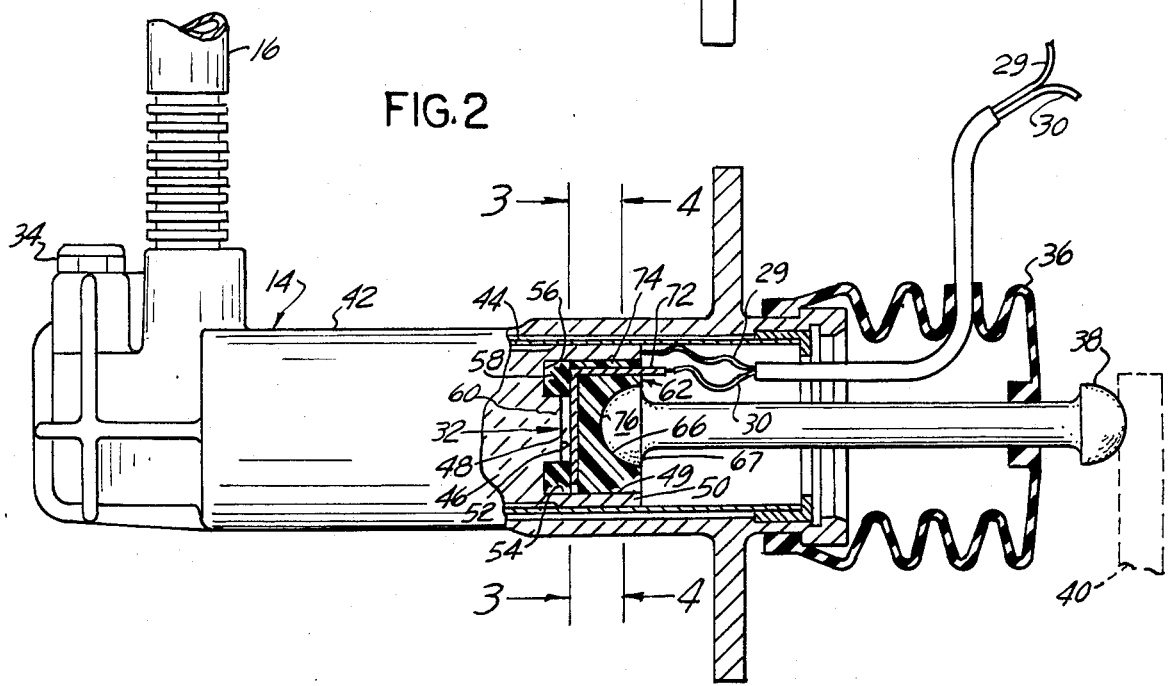
FIG. 2 is a side elevation, partly in section, of a slave cylinder having a switch construction according to the present invention.

FIG. 2 shows a preferred embodiment of such a more reliable switch, or sensing means 32 according to the invention, and referring now thereto, the slave cylinder 14 is illustrated as being connected through the conduit 16 to the master cylinder, not shown, a common bleed plug 34 closing the bleed opening. The slave cylinder 14 is provided at an end with a typical flexible boot 36, through which projects the piston rod 38 having its free end in engagement with the clutch release mechanism 40, or other mechanism to be operated. The slave cylinder 14, as shown, may be formed of a synthetic material housing 42 and is provided with an internal sleeve 44 which forms the cylinder wall for a piston 46. The piston 46 is formed of an electrically conductive material such as aluminum.

Figure 4:
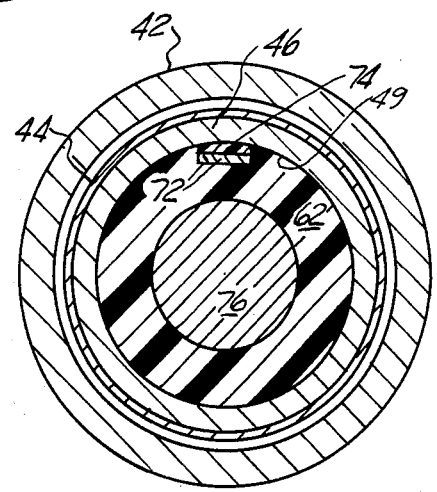
FIG. 4 is a sectional view taken along line 4—4 of FIG. 2.

The piston 46 has a chamber 48 open at the right-hand end 50 of the piston, as illustrated in FIGS. 1 and 4. The chamber 48 is formed of a side wall which, as illustrated at 49 in FIG. 4 is preferably cylindrical, and a bottom or inner wall 52, FIG. 2.

A recess 54, preferably an annular recess, is formed in the bottom wall 52 of the chamber. The recess has a base 56, and an annular member 58 substantially fills the annular recess 54. The annular member 58 projects above a central portion 60 of bottom wall 52 of the chamber 48 in piston 46. The annular member 58 is formed of a compressible elastic material. In the preferred form illustrated a cellular synthetic rubber is used, but other compressible rubber-like elastic material can be used. The annular member 58 is dimensioned such that when unloaded it projects above a central portion 60 of the bottom or inner wall 52 of the chamber 48 while in contact with the base 56 of the annular recess 54 with the cental portion 60 of bottom wall 52 thus lying below the portion of annular member 58 extending above bottom or inner wall 52. The dimensioning is such however that annular member 58 can be compressed inwardly of recess 54 until it is completely received within the recess 54, and its outer face lies in the same plane as the exposed face of central portion 60 of bottom wall 52. The central portion 60 of wall 52 is electrically conductive.

Figure 5:
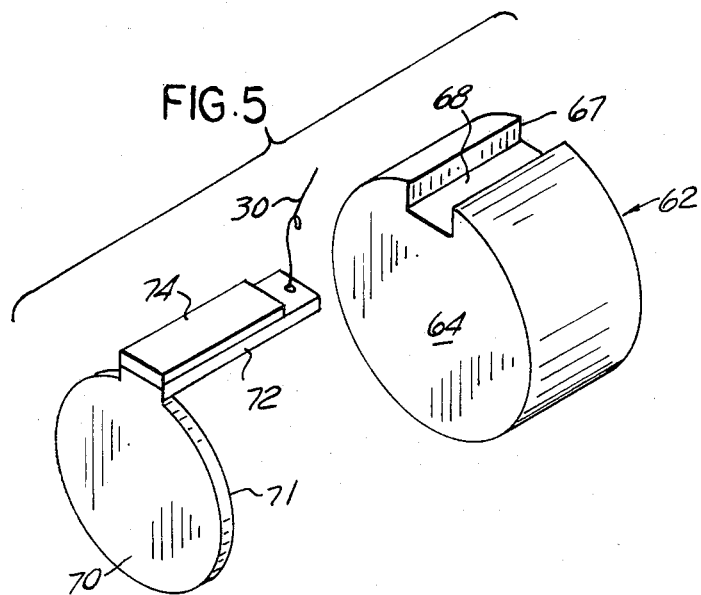
FIG. 5 is a perspective view of an electrical contact member and a cylindrical insert member.
Figure 3:
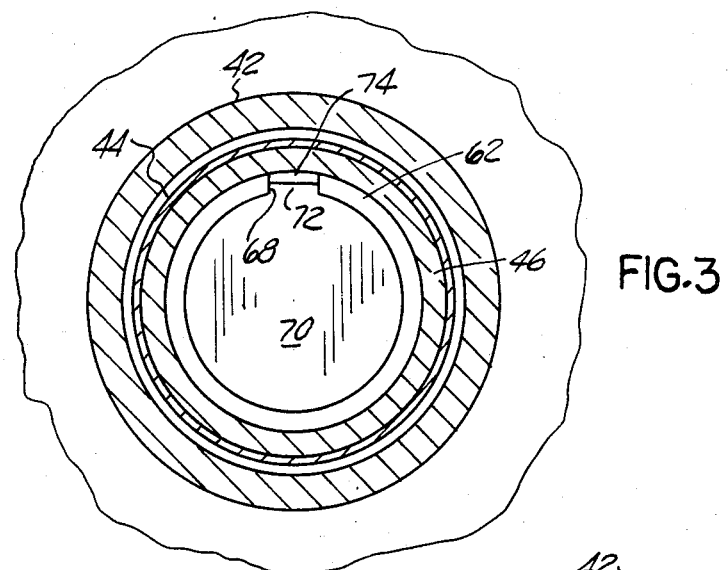
FIG. 3 is a sectional view taken along line 3—3 of FIG. 2.

An insert 62 is of cylindrical shape in cross-section, see FIGS. 3, 4 and 5, and has a flat base 64 extending transversely of its length at its left-hand end, as shown in FIGS. 2 and 5, and a hemispherical opening 66 centrally of its opposite end 67, as shown in FIG. 2. The insert 62 is positioned between the piston rod 38 and the central portion of the bottom wall 52 of the chamber 48 and extends over the annular member 58.

The insert has a channel 68 extending from its one end 64 to its other end 67. An electrically conductive member 70 having a main portion 71 formed as a thin disk of slightly less diameter than the cylindrical insert 62 is positioned between the insert 62 and the electrically conductive portion 60 of the cylinder. The electrically conductive disk-shaped member 70 has an integral leg 72 extending outwardly of, and at a right angle to, its main portion 71. The leg 72 is received within the channel 68 with the disk-shaped member 70 bearing against the face 64 of the insert 62 and against the annular member 58. The leg 72 is of a length such that it projects outwardly from the insert 62 to the right as viewed in FIG. 2. The insert 62 is formed of an electrically non-conductive material and an insulating member 74 is press-fitted into the channel 68 to insulate the leg 72 of the disk-shaped member 70 from the cylinder wall. The diameter of the main portion 71 of the disk-shaped member 70 is such that the periphery of the thin cylindrical main portion 71 does not contact, as shown in FIGS. 2 and 3, the cylindrical wall of chamber 48. As stated heretofore the compressible annular member 58 when uncompressed projects above the base 56 of the chamber 48 and thus holds the electrically conductive disk-shaped member outwardly from the base 56 of chamber 48. The insert with the member 74 has a slip fit with the chamber 48 and can slide lengthwise thereof.

The hemispherical head 76 of the piston rod is received within the mating hemispherical opening or recess 66 in the insert 62, and, with the elements dimensioned as indicated in the drawing, they are held in their relative positions shown in FIG. 2 by the pressure plate of the clutch, not shown, or the other device controlled by the master cylinder and slave cylinder arrangement.

Electrical connections are made to the piston 46 by the line 29 in a cable 80 and to the electrically conductive member 70 by the line 30 in the cable 80. The lines are connected to the piston 46 and to the leg 72 by brazing. The disk-shaped member 70 may be formed of aluminum, as in the preferred form illustrated, or copper or other conductive material such as a synthetic having a conductive coating or the like. The piston 46 may be formed, as in the preferred form, of aluminum.

If desired, however, the piston 46 could be formed of a non-conductive synthetic material with a conductive metal plate and attached electrical lead embedded into the piston such that the conductive plate forms at least the electrically conductive portion of the bottom or inner wall 52 of the chamber 48 which faces the electrically conductive member 70.

When fluid under adequate pressure is applied to the piston 46 in sufficient quantity the clutch is released and, with proper selection of the components illustrated, the resilient annular compressible member 58 is compressed until the electrically conductive disk-shaped member 70 contacts the electrically conductive portion 60 of the piston which faces the disk-shaped member 70, the chamber 48 being preferably vented to atmosphere via an appropriate passageway, not shown. This results in the switch circuit closing and the interlocks and/or indicator means connected thereto being energized. For example a starter motor actuating relay, such as schematically illustrated at FIG. 1 at 31, could be held inoperative unless the interlock switch 32 is closed. When pressure is lowered again, the annular member 58 expands as the clutch moves to engaged position and the insert 62 moves outwardly relative to the piston 46 within the chamber 48 resulting in movement of the electrically conductive disk-shaped member 70 away from the conductive portion 60 of the piston 46, thus opening the circuit to which are connected the lines 29 and 30.

From the above it will be apparent that in its preferred form the invention comprises a compressible resilient member mounted in the piston transversely of the piston rod and facing the piston rod, with the piston having an electrically conductive portion, and there is an electrically conductive member facing the compressible member and positioned between the piston rod and the electrically conductive portion of the piston with the compressible member normally maintaining the electrically conductive member away from the electrically conductive portion of the piston. The positioning of the elements, their relative dimensions, and the resistance of the piston rod to movement, and the compressibility of the compressible members can obviously be selected such that when fluid pressure is applied sufficiently to move the piston rod the resilient compressible member is compressed and the two electrically conductive elements will come into contact. When pressure is reduced below that required to compress the resilient compressible member the electrical contact will be broken.

Having thus described the present invention by way of an example of structure, given for illustrative purpose only, which is well designed for accomplishing the objects of the invention, modifications whereof will be apparent to those skilled in the art, what is claimed as new is as follows:

1. An electrical switch for a hydraulic system comprising a hydraulic cylinder, a piston movable within said cylinder under the influence of fluid pressure within said cylinder, and a metallic piston rod disposed between said piston and a load, said switch comprising a compressible member mounted in said piston transversely of said piston rod, said piston having an electrically conductive portion, an electrically conductive member facing said compressible member and positioned between said piston rod and said electrically conductive portion of said piston, and an electrically non-conductive insert between said piston rod and said electrically conductive member for insulating said piston rod from said electrically conductive member, wherein said compressible member normally maintains said electrically conductive member spacially from said electrically conductive portion of said piston, said electrically conductive member is positioned relative to said electrically conductive portion of said piston and said compressible member has a compressibility such that when fluid pressure is applied to said piston to move said piston rod for displacing said load said compressible member is compressed and said electrically conductive member engages said electrically conductive portion of said piston for closing an electric circuit.

2. The electrical switch of claim 1 wherein said electrically non-conductive insert has a channel formed therein, said electrically conductive member has a portion extending through said channel, and said electrically conductive member is supported by said electrically non-conductive insert.

3. The electrical switch of claim 1 comprising a chamber is said piston, said chamber having a base and an open end, an annular recess in said base of said chamber, said electrically conductive portion of said piston being positioned within said annular recess and projecting toward said open end of said chamber, said compressible member being positioned in said annular recess and extending from said base of said chamber outwardly of said annular recess into said chamber toward said open end, wherein said electrically conductive member and said electrically non-conductive member are disposed in said open end.

4. In combination with a hydraulic cylinder having a piston displaceable by fluid pressure, said piston being adapted to actuate a piston rod connected to a mechanical component, a pressure actuated normally open switch associated with said cylinder, said switch being operable to close an electrical circuit only when fluid pressure in said cylinder reaches a predetermined value corresponding to full actuation of said mechanical component, said switch comprising a compressible member mounted in said piston transversely of said piston rod, said piston having an electrically conductive portion, an electrically conductive member facing said compressible member and positioned between said piston rod and said electrically conductive portion of said piston, and an electrically non-conductive insert between said piston rod and said electrically conductive member for insulating said piston rod from said electrically conductive member, wherein said compressible member normally maintains said electrically conductive member spacially from said electrically conductive portion of said piston, said electrically conductive member is positioned relative to said electrically conductive portion of said piston and said compressible member has a compressibility such that when fluid pressure is applied to said piston to move said piston rod for actuating said mechanical component said compressible member is compressed and said electrically conductive member engages said electrically conductive portion of said piston for closing an electrical circuit.

5. The combination of claim 4 wherein said hydraulic cylinder is the slave cylinder of a motor vehicle clutch control hydraulic apparatus, and said mechanical component is a clutch release mechanism.

6. The combination of claim 4 wherein said circuit is a motor vehicle engine starter relay circuit.

7. The combination of claim 5 wherein said circuit is a motor vehicle engine starter relay circuit.

* * * * *